(12) United States Patent
Hsia et al.

(10) Patent No.: US 9,277,603 B2
(45) Date of Patent: Mar. 1, 2016

(54) LINEAR SOLID-STATE LIGHTING WITH FREQUENCY SENSING FREE OF FIRE AND SHOCK HAZARDS

(71) Applicant: Lightel Technologies, Inc., Renton, WA (US)

(72) Inventors: Chungho Hsia, Bellevue, WA (US); Pai-Sheng Shen, Bellevue, WA (US)

(73) Assignee: Lightel Technologies, Inc., Renton, WA (US)

(*) Notice: Subject to any disclaimer, the term of this patent is extended or adjusted under 35 U.S.C. 154(b) by 91 days.

(21) Appl. No.: 14/465,174

(22) Filed: Aug. 21, 2014

(65) Prior Publication Data

US 2015/0181661 A1    Jun. 25, 2015

Related U.S. Application Data

(63) Continuation-in-part of application No. 14/135,116, filed on Dec. 19, 2013, now Pat. No. 9,163,818.

(51) Int. Cl.
| | |
|---|---|
| H05B 37/02 | (2006.01) |
| H05B 33/08 | (2006.01) |
| F21V 25/04 | (2006.01) |
| F21K 99/00 | (2010.01) |
| F21Y 101/02 | (2006.01) |

(52) U.S. Cl.
CPC ............ *H05B 33/0803* (2013.01); *F21K 9/175* (2013.01); *F21V 25/04* (2013.01); *H05B 33/0806* (2013.01); *F21Y 2101/02* (2013.01); *Y02B 20/341* (2013.01)

(58) Field of Classification Search
USPC ............. 315/209 R, 224, 291, 307, 308, 312, 315/313, 320
See application file for complete search history.

(56) References Cited

U.S. PATENT DOCUMENTS

| 8,664,880 B2 * | 3/2014 | Ivey | H05B 33/0803 |
| | | | 315/224 |
| 8,760,064 B1 * | 6/2014 | Yoon | H05B 33/0842 |
| | | | 315/185 R |
| 9,232,578 * | 1/2016 | Malboeuf Joset | H05B 33/0815 |
| 2014/0225519 A1 * | 8/2014 | Yu | H05B 33/0809 |
| | | | 315/187 |

\* cited by examiner

*Primary Examiner* — Douglas W Owens
*Assistant Examiner* — James H Cho
(74) *Attorney, Agent, or Firm* — Han IP Corporation

(57) ABSTRACT

A linear light-emitting diode (LED)-based solid-state universal lamp using a frequency sensing and control mechanism operates normally with both an electronic ballast and the AC mains. The frequency sensing and control mechanism automatically detects voltage types associated with output voltages from the ballast and the AC mains in a single-ended or a double-ended lamp fixture and makes proper management so that the universal lamp works for either case and in either fixture without operational uncertainty. When two shock protection switches are used in two lamp bases, the universal lamp fully protects a person from possible electric shock during initial installation and re-lamping.

20 Claims, 6 Drawing Sheets

LINEAR SOLID-STATE LIGHTING WITH FREQUENCY SENSING FREE OF FIRE AND SHOCK HAZARDS

CROSS-REFERENCE TO RELATED APPLICATIONS

This application is a continuation-in-part (CIP) of U.S. patent application Ser. No. 14/135,116, filed Dec. 19, 2013 and currently pending, which is incorporated herein by reference in its entirety.

BACKGROUND

1. Technical Field

The present disclosure relates to linear light-emitting diode (LED) lamps that work with linear tube lamp fixtures configured to electrically connect either instant-start electronic ballast or the AC mains, and more particularly to a universal, shock and fire hazard-free linear LED tube lamp with a shock-protection mechanism.

2. Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit application of a linear LED tube (LLT) lamp to replace an existing fluorescent tube, consumers may choose either to adopt a ballast-compatible LLT lamp with an existing ballast used to operate the fluorescent tube or to employ an AC mains-operable LED lamp by removing/bypassing the ballast. Either retrofit application has its advantages and disadvantages. In the former case, although the ballast consumes extra power, it is straightforward to replace the fluorescent tube without rewiring, which consumers have a first impression that it is the best alternative to fluorescent tube lamps. But the fact is that total cost of ownership for this approach is high regardless of very low initial cost. For example, the ballast-compatible LLT lamps work only with particular types of ballasts. If the existing ballast is not compatible with the ballast-compatible LLT lamp, the consumer will have to replace the ballast. Some facilities built long time ago incorporate different types of fixtures, which requires extensive labor for both identifying ballasts and replacing incompatible ones. Moreover, a ballast-compatible LLT lamp can operate longer than the ballast. When an old ballast fails, a new ballast will be needed to replace in order to keep the ballast-compatible LLT lamps working. Maintenance will be complicated, sometimes for lamps and sometimes for ballasts. The incurred cost will preponderate over the initial cost savings by changeover to the ballast-compatible LLT lamps for hundreds of fixtures throughout a facility. When the ballast in a fixture dies, all the ballast-compatible tube lamps in the fixture go out until the ballast is replaced. In addition, replacing a failed ballast requires a certified electrician. The labor costs and long-term maintenance costs will be unacceptable to end users. From energy saving point of view, a ballast constantly draws power, even when the ballast-compatible LLT lamps are dead or not installed. In this sense, any energy saved while using the ballast-compatible LLT becomes meaningless with the constant energy use by the ballast. In the long run, ballast-compatible LLT lamps are more expensive and less efficient than self-sustaining AC mains-operable LLT lamps.

On the contrary, an AC mains-operable LLT lamp does not require a ballast to operate. Before use of an AC mains-operable LLT lamp, the ballast in a fixture must be removed or bypassed. Removing or bypassing the ballast does not require an electrician and can be replaced by end users. Each AC mains-operable LLT lamp is self-sustaining. If one AC mains-operable tube lamp in a fixture goes out, other lamps in the fixture are not affected. Once installed, the AC mains-operable LLT lamps will only need to be replaced after 50,000 hours. In view of above advantages and disadvantages of both ballast-compatible LLT lamps and AC mains-operable LLT lamps, it seems that market needs a most cost-effectively solution by using a universal LLT lamp that can be used with the AC mains and is compatible with an electronic ballast so that LLT lamp users can save an initial cost by changeover to such a universal LLT lamp followed by retrofitting the lamp fixture to be used with the AC mains when the ballast dies. Electronic ballasts have several different types. However in the US, instant-start electronic ballasts are most popular in lamp fixtures because they are more efficient and less expensive than other types of electronic ballasts and have few wires for installation. In this sense, the instant-start electronic ballast is emphasized in the present disclosure although the electronic ballast will be used hereafter to represent the instant-start electronic ballast for simplicity.

The AC mains-operable LLT lamp does not need a high voltage to ionize the gases inside the gas-filled fluorescent tube before sustaining continuous lighting. However, such LLT lamps operating at the AC mains, 110, 220, or 277 VAC, have one construction issue related to product safety and needed to be resolved prior to wide field deployment. This kind of LLT lamps always fails a safety test, which measures through lamp leakage current. Because the line and the neutral of the AC mains apply to both opposite ends of the tube when connected, the measurement of current leakage from one end to the other consistently results in a substantial current flow, which may present a risk of shock during re-lamping. Due to this potential shock risk to the person who replaces LLT lamps in an existing fluorescent tube fixture, Underwriters Laboratories (UL) uses its standard, UL 935, Risk of Shock During Relamping (Through Lamp), to do a current leakage test and to determine if LLT lamps under test meet the consumer safety requirement.

In the U.S. patent application Ser. No. 14/135,116, filed Dec. 19, 2013, two double shock protection switches and a degenerate voltage sensing and control mechanism are adopted in an LLT lamp such that AC power from any two pins of four pins in the LLT lamp can operate the lamp without operational uncertainty and fire or shock hazards due to misapplications of a power supply connection. In other words, no matter what a lamp fixture is configured as single-ended or double-ended, the LLT lamp automatically detects it and works for either configuration. However, such an LLT lamp can only operate with the AC mains and is not compatible with an electronic ballast.

FIGS. 1 and 2 respectively depict an AC mains-operable LLT lamp installed in double-ended and single-ended fixture lamp holders. The LLT lamp 300 comprises a housing having two ends; two lamp bases 660 and 760 having respective bi-pins 250 and 350 at each end of the housing; two actuation mechanisms 640 and 740 of shock protection switches 610 and 710 in the two lamp bases 660 and 760, respectively; two degenerate voltage sensing and control devices; an LED driver 400 having two inputs; and LED arrays 214 on an LED PCB. Essentially the degenerate voltage sensing and control devices are embodied in two bridge rectifiers 603 and 604, wherein each bridge rectifier comprises four diodes. The two bridge rectifiers 603 and 604 are connected to an LED driver 400 in parallel such that the positive and the negative input/output ports 503 and 504 of the first bridge rectifier 603 respectively connect to the positive and the negative input/output ports 505 and 506 of the second bridge rectifier 604. Furthermore, the eight diodes in the two bridge rectifiers are partially paired to perform a full wave rectification of the AC voltage from the AC mains according to single-ended or double-ended wiring configuration in the lamp fixture.

A diode conducts an electric current if it is forward biased but blocks a current flow if it is reverse biased. Taking advantage of this property, each diode in the bridge rectifiers 603 and 604 can sense an electric potential difference between its two ports and convert AC to DC if an AC voltage is applied to a circuit with a diode connected in a proper manner. With the eight diodes configured in FIG. 1 and FIG. 2, the two bridge rectifiers 603 and 604 can control the electric current flows to the LED driver and the electric current return, thus delivering a power to the LED driver.

In FIG. 1, when the lamp bases 660 and 760 are respectively installed in the fixture lamp holders 810 and 820, the actuation mechanisms 640 and 740 are actuated to turn on both sets of electrical contacts on the shock protection switches 610 and 710. The diodes 611 and 612 in the bridge rectifier 603 detect an electric current path and conduct a positive cycle of an electric current from the socket 255 of the fixture lamp holder 810 (where "L" of the AC mains is designated), the electrical contacts 401 and 403, the input/output ports 402 and 404, the diodes 611 and 612, the input/output port 503, the first input 501 of the LED driver 400 to the LED driver 400, returned from the LED driver 400, through the second input 502 of the LED driver 400, the input/output port 506, the diodes 617 and 618, and the electrical contacts 405 and 407 to "N" of the AC mains, thus delivering a power to the LED driver 400. In this electric current path, the diodes 611 and 612, 617, and 618 are forward biased whereas the diodes 613, 614, 615, and 616 are reverse biased, so the electric current can go through a correct path from "L" to "N" of the AC mains. Similarly for a negative cycle except that the diodes 613, 614, 615, and 616 are forward biased whereas the diodes 611, 612, 617, and 618 are reverse biased, an electric current can start from the fixture lamp holder 820, the diodes 615 and 616, the input/output port 505, the first input 501 of the LED driver 400 to the LED driver 400, returned from the LED driver 400, through the second input 502 of the LED driver 400, the input/output port 504, the diodes 613 and 614 to the fixture lamp holder 810, thus delivering a power to the LED driver 400. In FIG. 1, any electric current will not leak out from the exposed bi-pins because once, for example, the lamp base 660 is out of the socket of the lamp holder 810, the actuation mechanism 640 will be deactivated, turning off the switch 610, thus disconnecting the electric current—no electric shock hazard. Similarly for the lamp base 760, when the lamp base 760 is out of the socket of the lamp holder 820, the actuation mechanism 740 is deactivated, turning off the switch 710, thus disconnecting the electric current from flowing out to electrically shock an installer.

In FIG. 2, the LLT lamp 300 is installed in a single-ended fixture in such a way that the lamp bases 660 and 760 respectively connect to the fixture lamp holders 910 and 920, to which "L" and "N" of the AC mains are respectively connected. The actuation mechanisms 640 and 740 are actuated to turn on both sets of electrical contacts on the shock protection switches 610 and 710. The diode 611 in the bridge rectifier 603 detects an electric current path and conduct a positive cycle of an electric current from the socket 255 (where "L" of the AC mains is designated) in the fixture lamp holder 910, the electrical contact 401, the input/output port 402, the diode 611, the input/output port 503, the first input 501 of the LED driver 400 to the LED driver 400, returned from the LED driver 400, through the second input 502 of the LED driver 400, the input/output port 504, the diode 614, the input/output port 404, and the electrical contact 403, to the socket 256 (where "N" of the AC mains is designated) in the fixture lamp holder 910, thus delivering a power to the LED driver 400. In this case, the diodes 611 and 614 are forward biased whereas the diodes 612 and 613 are reverse biased, so the electric current can go through a correct path from "L" to "N" of the AC mains. Similarly for a negative cycle except that the diodes 612 and 613 are forward biased whereas the diodes 611 and 614 are reverse biased, an electric current can start from the socket 256 in the fixture lamp holder 910, the electrical contact 403, input/output port 404, the diode 612, the input/output port 503, the first input 501 of the LED driver 400 to the LED driver 400, returned from the LED driver 400, through the second input 502 of the LED driver 400, the input/output port 504, the diode 613, the input/output port 402, and the electrical contact 401, to the socket 255 in the fixture lamp holder 910, thus delivering the negative cycle of the power to the LED driver 400.

When the two pins of bi-pin in the lamp base 660 of the LLT lamp 300 are first inserted into the sockets 255 and 256 of the fixture lamp holder 910, the LED driver 400 immediately obtains a power via the bridge rectifier 603 no matter whether the lamp base 760 is installed in the fixture lamp holder 920 or not. However, the electric current returned from the LED driver 400 can flow from the input/output port 506, the diodes 617 and 618 in the bridge rectifier 604 to the two pins of the bi-pin 350 in the lamp base 760. If there is no shock protection switch 710 along the path in between the input/output ports 406 and 408 and the two pins of the bi-pin 350, when the two pins of the bi-pin 350 are exposed, the leakage current can flow out, creating an electric shock hazard if an installer touches the bi-pin 350. Therefore, the shock protection switch 710 and the actuation mechanism 740 in place can prevent the electric shock hazard from happening because only when the lamp base 760 is installed in the fixture lamp holder 920, is the actuation mechanism actuated to turn on the switch 710. Although "L" and "N" are connected to the lamp base 660 in FIG. 2, the LLT lamp 300 can still operate when the AC mains connect to the lamp base 760 rather than the lamp base 660 because the two bridge rectifiers 603 and 604 are connected to the LED driver 400 in parallel through the two inputs 501 and 502 of the LED driver 400, and the two bridge rectifiers 603 and 604 are symmetric at the two ends of the LLT lamp. Similarly for double-ended linear fixtures, when "L" and "N" shown in FIG. 1 are exchanged, the LLT lamp can still operate. The embodiments depicted in FIGS. 1 and 2 have an advantage of being simple and also passive without pre-power to operate. Thus, it is easy to implement.

Misapplications of power supply connections for conventional LLT lamps that substitute for linear fluorescent lamps are main causes of fire and electric shock hazards today, where the conventional LLT lamps are incorrectly connected to a supply source, the lamp base is either inserted incorrectly into a lamp holder or inserted into a lamp holder not intended for the conventional LLT lamp, or a conventional LLT lamp is connected to lamp holders with supply connections that do not match the lamp configuration. All of these misapplications may result in fire and shock hazards.

To completely remove these hazards from conventional LLT lamps, manufacturers need to ensure at first no electrically shorted ends in either single-ended or double-ended LLT lamps. For double-ended LLT lamps that operate in an AC-mains configuration, double protection switches on both ends of the LLT lamps must be used without compromise, the same for the lamps operable in both double-ended and single-ended fixtures. Whereas a lamp fixture may be wired single-ended or double-ended with the AC mains, or wired for operating with an electronic ballast, an LLT lamp may be configured internally in the similar fashion. However, any incompatible combinations of the conventional LLT lamps and the fixtures lead to failure of operation. These kinds of operational uncertainty, inconvenience, and possible hazards may severely affect the willingness of the consumers to adopt conventional LLT lamps. Therefore, it is believed that a universal LLT lamp is needed to work not only with the AC mains but also with an electronic ballast without uncertainty and hazards when installed in either single-ended or double-ended fixtures during initial installation or during lamp replacement when the above-mentioned misapplications may occur.

SUMMARY

A universal linear LED tube (LLT) lamp comprising a housing having two ends, an LED printed circuit board (PCB) with a plurality of LEDs connected as LED arrays, a lens, two bridge rectifiers each having two inputs connecting to two pins of a bi-pin at each end of the lamp, a frequency sensing and control mechanism, an LED driving circuit, and a shock protection mechanism, is used to replace a fluorescent tube in a retrofit or newly-made linear tube lamp fixture that could have an existing electronic ballast or simply an AC mains-ready configuration. When such a universal LLT lamp is installed in the fixture, the frequency sensing and control mechanism can detect input voltage type and make proper and necessary management so that the universal LLT lamp can operate with the existing electronic ballast or simply with the AC mains without operational uncertainty. When such a frequency sensing and control configuration is used with shock protection switches on both ends of the universal LLT lamp, the shock protection switches can effectively block an electric current flowing through the frequency sensing and control mechanism and the LED driving circuit to an exposed bi-pin not yet installed in the fixture sockets, no matter whether the current is from the AC mains or ballast outputs. Therefore, no line voltage or leakage current will possibly appear at the exposed bi-pin during initial installation or re-lamping, thus completely eliminating risks of fire and electric shocks. In an embodiment, the universal lamp can operate not only in a double-ended fixture with an AC voltage from the AC mains or an electronic ballast supplied from the two ends of the lamp but also in a single-ended fixture with an AC voltage from the AC mains supplied from either end of the two ends of the lamp without shock hazards.

The frequency sensing and control mechanism comprises a frequency sensitive device and a control device with two inputs each respectively connecting to one of two pins of the bi-pins associated with two ends of the universal LLT lamp. The frequency sensitive device detects frequency of an input voltage and converts it into a signal to send to the control device. The control device receives the signal and controls electric current paths to deliver a power to the LED driving circuit, which then provides an appropriate voltage and current to operate the LED arrays. In this scheme, two outputs with the same polarity of each of the two bridge rectifiers are respectively connected to have a common high electric potential port relative to a common low electric potential port. The electric current paths are reconfigurable according to the frequency detected, either 50~60 Hz from the AC mains or 40~50 KHz from an electronic ballast. The LED driving circuit is a modified Buck converter having two high electric potential inputs, comprising an electronic switch, control logics, a current sensing resistor, a capacitor, a diode, and a center-tapped inductor. When the control device determines that input voltage is from the electronic ballast, it makes an electric connection between the common high electric potential port of the bridge rectifiers and the first high electric potential input of the modified Buck converter. When the control device determines that input voltage is from the AC mains, it makes an electric connection between the common high electric potential port of the bridge rectifiers and the second high electric potential input of the modified Buck converter in a way to facilitate the electric current flow into the LED arrays.

Consumers can safely install such a universal LLT lamp in an existing lamp fixture used to operate a conventional fluorescent tube without operational uncertainty and electric shock or fire hazards, no matter how the fixture is wired, single-ended AC mains, double-ended AC mains, or electronic ballast. The universal LLT lamp can immediately be used with an existing electronic ballast in a fixture without rewiring. When the ballast dies, consumers may choose to replace it with a new one at cost or just to bypass it and to electrically connect the fixture as an AC mains-operable one. In the latter case, the consumers can just install the universal LLT lamp back into the fixture without worrying about possible electric shock hazard that may occur when they accidentally touch an exposed bi-pin on the other end of the lamp, or possible fire hazard due to misapplications of a power supplied to the lamp.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
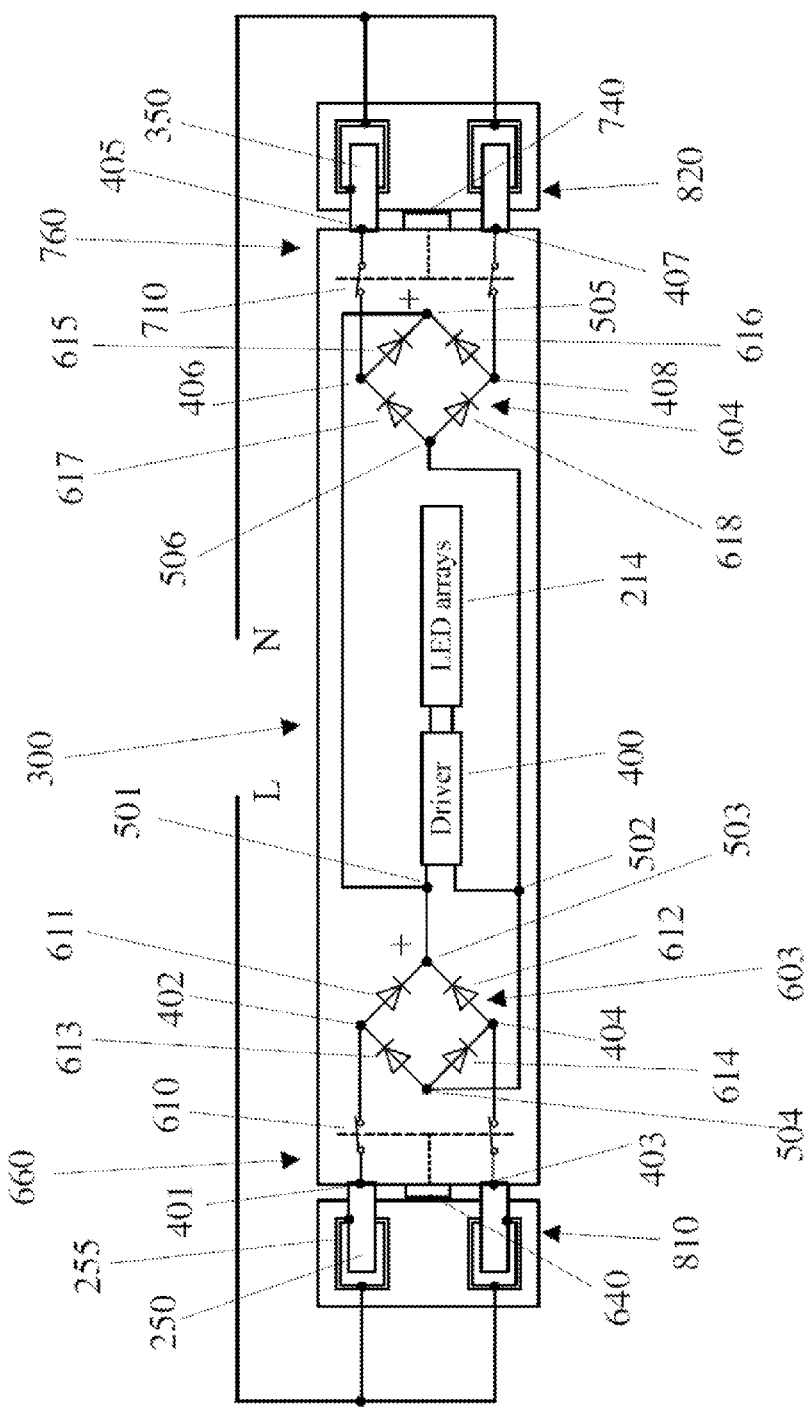
FIG. 1 is a block diagram of an LLT lamp operable only with the AC mains, in which the lamp is installed in a double-ended fixture lamp holder.
Figure 2:
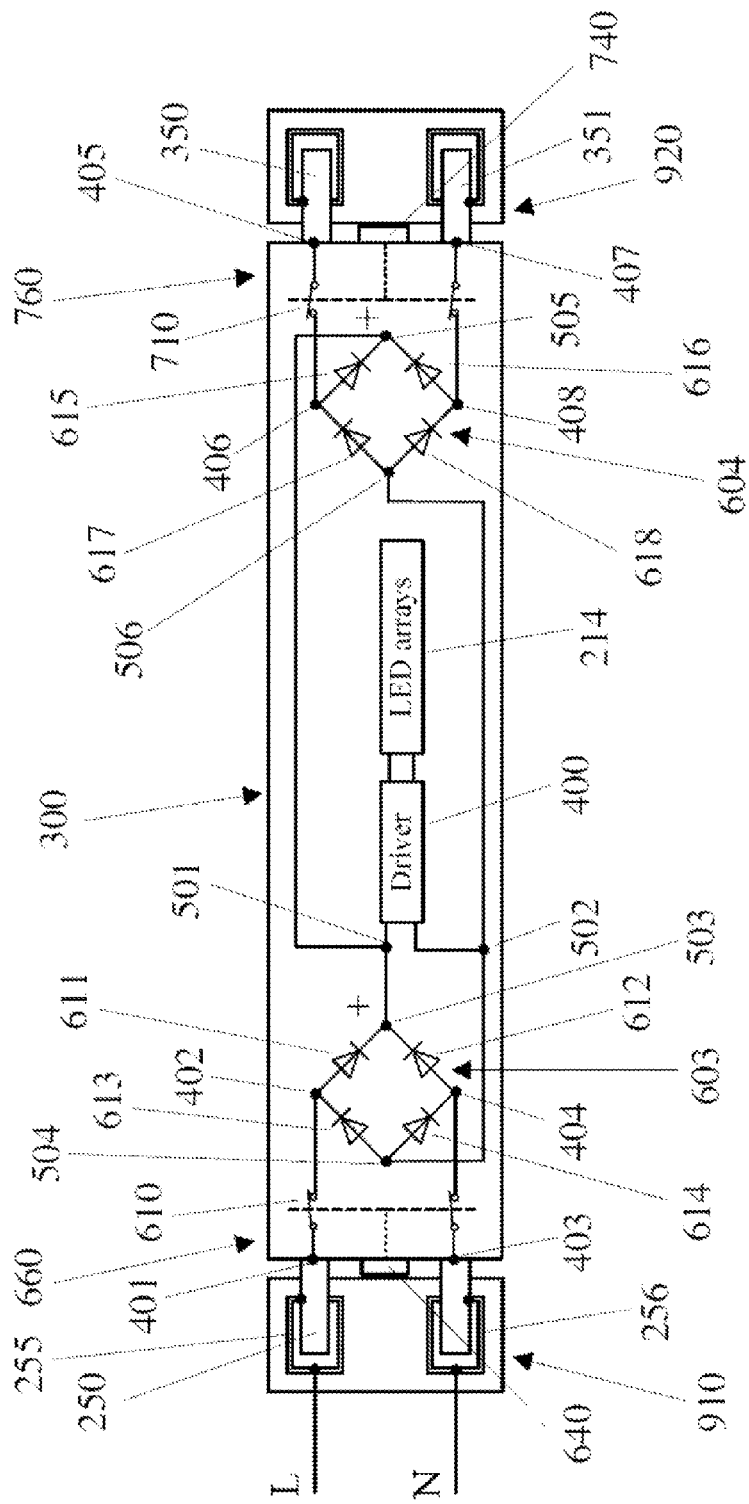
FIG. 2 is a block diagram of an LLT lamp operable only with the AC mains, in which the lamp is installed in a single-ended fixture lamp holder.
Figure 3:
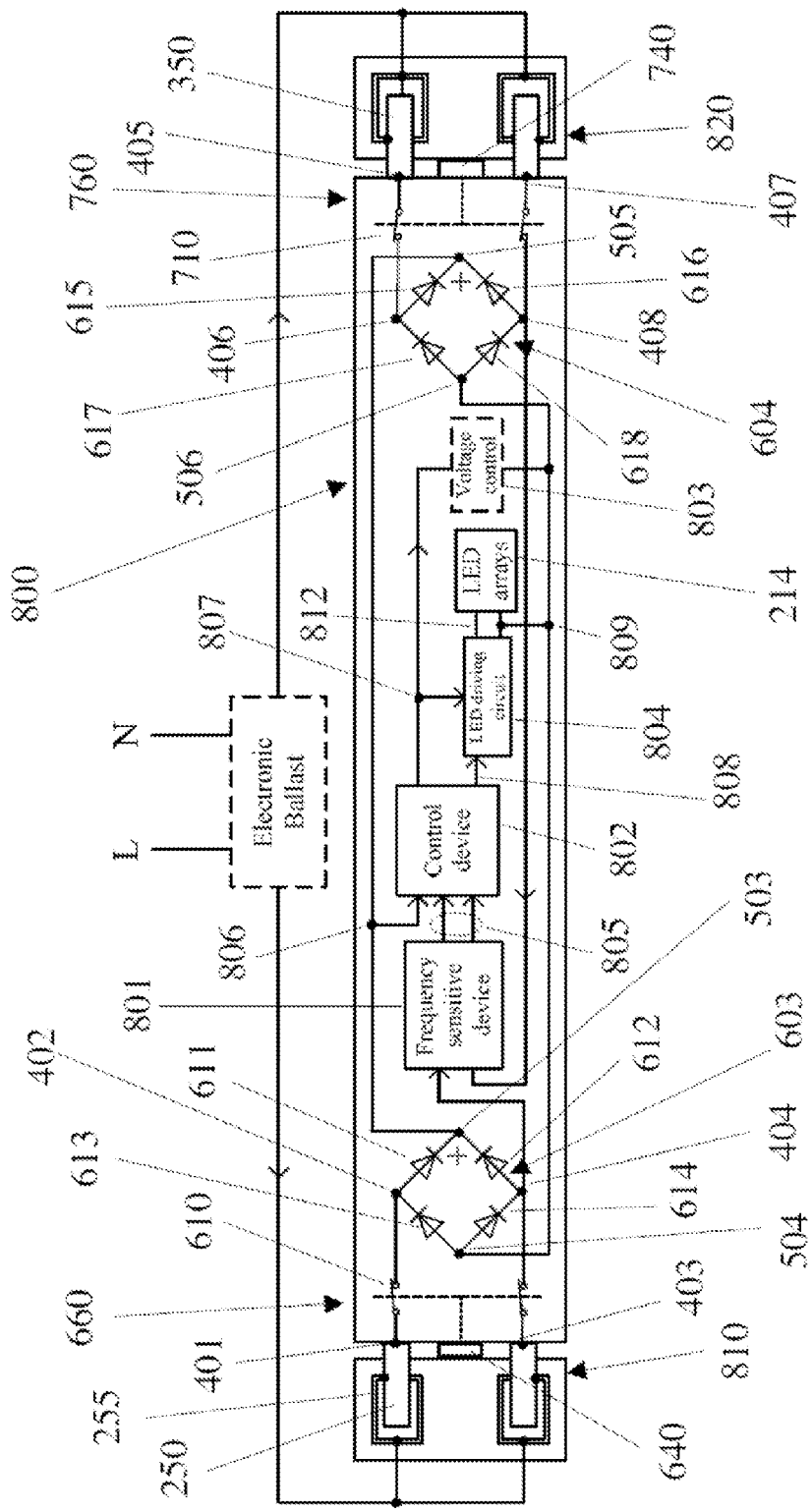
FIG. 3 is a block diagram of a universal LLT lamp operable with either the AC mains or an electronic ballast according to the present disclosure, in which the lamp is installed in a double-ended fixture lamp holder.
Figure 4:
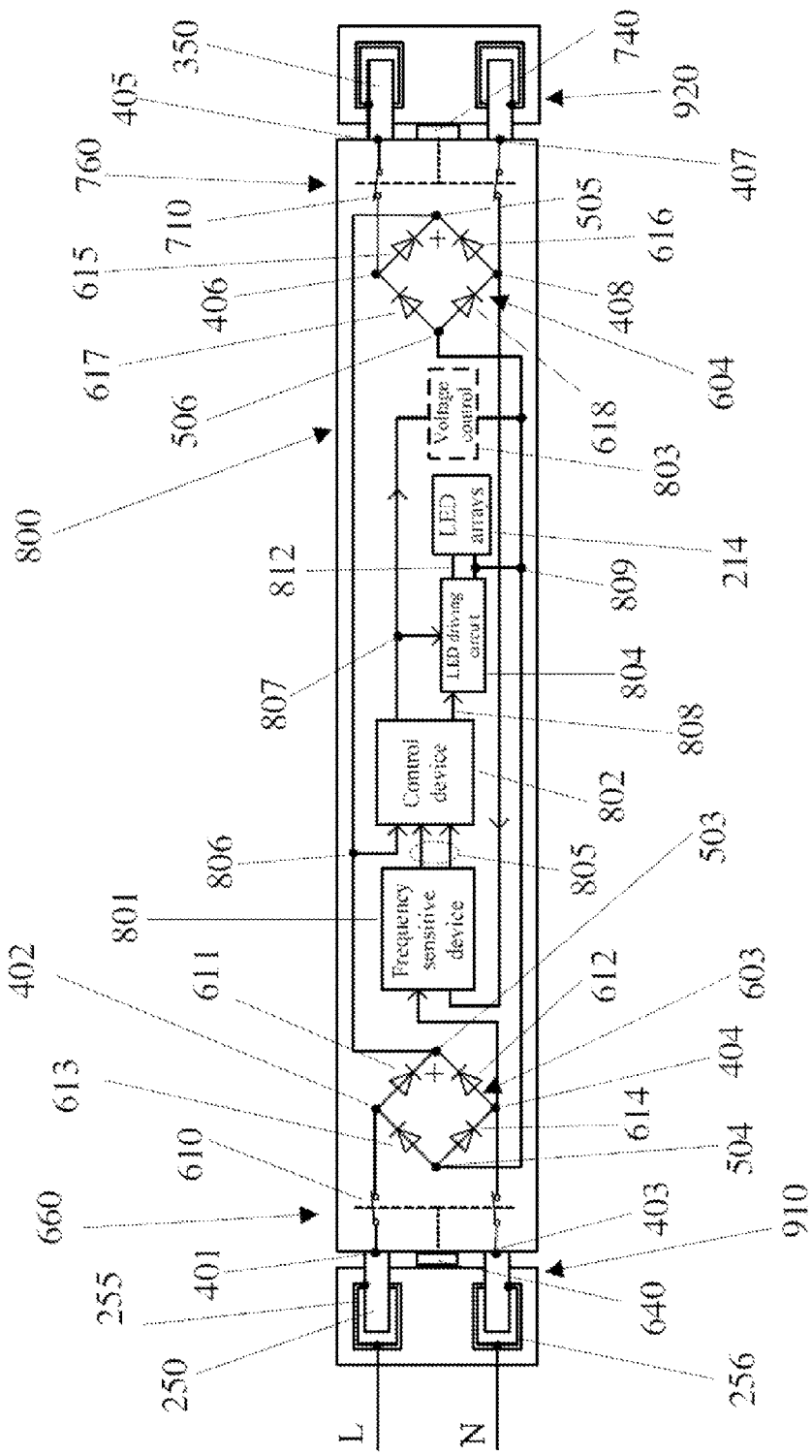
FIG. 4 is a block diagram of a universal LLT lamp operable with either the AC mains or an electronic ballast according to the present disclosure, in which the lamp is installed in a single-ended fixture lamp holder.

FIGS. 3-4 are block diagrams of a universal LLT lamp configured in a double-ended and a single-ended fixture according to the present disclosure. The universal LLT lamp 800 comprises a housing having two ends; two lamp bases 660 and 760 having respective bi-pins 250 and 350 at each end of the housing; two actuation mechanisms 640 and 740 of shock protection switches 610 and 710 respectively in the two lamp bases 660 and 760; two bridge rectifiers 603 and 604; a frequency sensing and control mechanism comprising a frequency sensitive device 801 and a control device 802; a voltage control device 803; an LED driving circuit 804 having two inputs 807 and 808 and a current return port 809; and LED arrays 214 on an LED PCB.

Each bridge rectifier comprises four diodes, 611, 612, 613, and 614 for the first bridge rectifier 603 and 615, 616, 617, and 618 for the second bridge rectifier 604. In the first bridge rectifier 603, the four diodes are interconnected with four input/output ports 402, 404, 503, and 504. Similarly, in the second bridge rectifier 604, the four diodes are interconnected with four input/output ports 406, 408, 505, and 506. The two bridge rectifiers 603 and 604 are electrically connected in parallel such that the positive and the negative input/output ports 503 and 504 of the first bridge rectifier 603 respectively connect to the positive and the negative input/output ports 505 and 506 of the second bridge rectifier 604. Furthermore, the eight diodes in the two bridge rectifiers are partially paired to perform a full wave rectification of the AC voltage from the AC mains or the electronic ballast in a double-ended wiring lamp fixture.

The protection switch 610 at the lamp base 660 is of double-pole single-throw type, which consists of one actuation mechanism 640 and two sets of electrical contacts. In the first set, the first electrical contact connects to the upper pin of the bi-pin 250 at an electrical contact 401 whereas the second electrical contact connects to the input/output port 402 of the first bridge rectifier 603. In the second set, the first electrical contact connects to the lower pin of the bi-pin 250 at an electrical contact 403 whereas the second electrical contact connects to the input/output port 404 of the first bridge rectifier 603. Similarly, the shock protection switch 710 at the other lamp base 760 comprises one actuation mechanism 740 and two sets of electrical contacts with electrical contacts 405 and 407 respectively connecting to the two pins of bi-pin 350 and the input/output ports 406 and 408 of the bridge rectifier 604, as shown in FIGS. 3 and 4.

FIG. 3 is a block diagram of the universal LLT lamp according to the present disclosure, in which the universal LLT lamp is installed in a double-ended fixture lamp holder. The lamp bases 660 and 760 respectively use the bi-pins 250 and 350 to connect to the AC mains or an electronic ballast through the shock protection switches 610 and 710 to the two bridge rectifiers 603 and 604. The shock protection switches 610 and 710 are normally "off" when the lamp is not installed in the fixture. When actuated (pressed in, twisted on, etc.), the actuation mechanisms 640 and 740 respectively actuate the protection switches 610 and 710 and turn on the connection between the AC mains or the electronic ballast and the two bridge rectifiers 603 and 604. The frequency sensitive device 801 connecting to the electrical contacts 404 and 408 receives a voltage from the lower pin of each bi-pin 250 and 350 at the two ends of the lamp through the respective switches 610 and 710. The control device 802 having three inputs receives a signal through a pair of inputs 805 from the frequency sensitive device 801 and at the same time receives a power through a third input 806 from the positive input/output port either 503 or 505 of the bridge rectifiers 603 or 604. The frequency sensitive device 801 detects the received voltage that is either a 50~60 Hz from the AC mains or 40~50 KHz output voltage from an electronic ballast and sends different signals according to the received voltage to the control device 802. When the control device 802 determines that the input power is from an electronic ballast, it executes a ballast mode, managing to couple the input power from the third input 806 to a voltage control device 803, which controls an output voltage to a predetermined level at its output connecting to the first input 807 of the LED driving circuit 804, thus powering the LED arrays 214. When the control device 802 determines that the input power is from the AC mains, it performs a normal mode, managing to couple the input power from the third input 806 to the second input 808 of the LED driving circuit 804, which converts the voltage received to a predetermined level and provides an electric current appropriate for driving LED to light.

When someone tries to install the universal LLT lamp 800 that can be operated with the AC mains or an electronic ballast in a double-ended fixture wired as an AC mains-ready or electronic ballast compatible configurations as in FIG. 3, she or he needs to first insert, for example, the lamp base 660 to the fixture lamp holder 810. The actuation mechanism 640 is actuated to turn on both sets of electrical contacts on the shock protection switch 610. The first bridge rectifier 603 automatically senses whether a voltage exists between the input/output ports 402 and 404. Because the fixture lamp holder sockets are connected in a double-ended manner, the input/output ports 402 and 404 have the same electrical potential, and no current return path is formed. Thus no power is delivered to the LED driving circuit 804 and the LED arrays 214. At this time, the actuation mechanism 740 is not actuated because the lamp base 760 has not yet been inserted into the lamp holder 820. So the shock protection switch 710 remains "off", disconnecting any electric current flow to the exposed bi-pin 350, and thus no leakage current can possibly flow out—no electric shock hazard. When the person who does the installation further inserts the lamp base 760 into the lamp holder 820, the actuation mechanism 740 is actuated, which turns on the shock protection switch 710, thus connecting the bi-pin 350 to the input/output ports 406 and 408. Again, the second bridge rectifier 604 senses no voltage between the input/output ports 406 and 408 and sends no power to the LED driving circuit 804. However, when the protection switch 710 is "on", an electric potential difference exists between the input/output ports 402 and 406. In this case, an electric current can flow from the input/output port 503 of the first bridge rectifier 603 through the third input 806 of the control device 802, to the LED driving circuit 804 via either the first input 807 or the second input 808 of the LED driving circuit 804 depending on the input voltage whether it is from the ballast or the AC mains, followed by a return path from the LED driving circuit 804, through the current return port 809 of the LED driving circuit 804, the input/output port 506 of the second bridge rectifier 604, and the input/output ports 406 and 408 to the bi-pin 350, thus delivering power to the LED driving circuit 804, which then powers and lights up the LED arrays 214.

When the control device 802 determines that the input power is from the electronic ballast, it controls the current to flow into both the first input 807 of the LED driving circuit 804 and the voltage control device 803 that is connected across the first input 807 and the current return port 809 of the LED driving circuit 804. The voltage control device 803 is used because the electronic ballast output voltage can be as high as 580 volts (rms). Once the LED arrays 214 are accidentally not electrically connected to the LED driving circuit 804, the voltage surge will rise to reach the rated maximum of some of the electronic components used and suddenly burn the components. However, the voltage control device 803 may not be needed if the LED arrays 214 are absolutely connected to the LED driving circuit 804 because the LED arrays 214 with a stacked forward voltage can clamp a high voltage to a predetermined level. Although in FIG. 3, the universal LLT lamp is shown to be installed in a linear double-ended fixture in which two sets of the sockets are in the opposite ends of the LLT lamp, the LLT lamp may be of U shape and may serve to replace a conventional U-Bend fluorescent light bulb to operate with either the AC mains or an electronic ballast.

FIG. 4 is a block diagram of the universal LLT lamp according to the present disclosure, in which the universal LLT lamp is installed in a single-ended fixture with a power input at the fixture lamp holder 910, which has two electrical sockets 255 and 256 receiving "L" and "N" of the AC mains, respectively. When someone tries to install the universal LLT lamp 800 in the single-ended fixture, she or he first inserts, for example, the lamp base 660 to the fixture lamp holder 910. As mentioned, the actuation mechanism 640 is actuated to turn on both sets of electrical contacts on the shock protection switch 610. The first bridge rectifier 603 senses that a voltage exists between the input/output ports 402 and 404, allowing a current to flow from "L" of the AC mains to the input/output port 503. Because the frequency sensitive device 801 connects to the electrical contacts 404 and 408 at the two ends 660 and 760 of the lamp 800, it receives no power from the end 660 and sends no signal to the control device 802. The control device 802 then determines to remain in the normal mode, keeping to connect the positive input/output port 503 of the first bridge rectifier 603 to the second input 808 of the LED driving circuit 804 through the third input 806 of the control device 802, thus allowing the current to flow through the connected path followed by a current return path from the current return port 809 of the LED driving circuit 804, the input/output ports 504 and 404 of the first bridge rectifier 603, to "N" of the AC mains, delivering the power to the LED driving circuit 804 which then converts the voltage received to a predetermined level and provides an appropriate electric current to power the LED arrays 214.

If no shock protection switch 710 is in place as shown in FIG. 4, an electric current flow from the LED driving circuit 804 can reach the input/output port 506 of the second bridge rectifier 604 so that a voltage will appear between the bi-pin 350 and the earth ground—an electric shock hazard if two pins of the bi-pin 350 in the lamp base 760 are not in the sockets of the fixture lamp holder 920. Therefore, the bridge rectifiers 603 and 604 and the shock protection mechanism adopted in this universal LLT lamp can work with either single-ended or double-ended fixtures free of operational uncertainty and fire and shock hazards due to lamp misapplications, as mentioned in the Background section of the present disclosure. For illustration purpose, the shock protection switches 610 and 710 are both of contact type, which can be a snap switch, a push-button switch, a micro switch, a twist-on switch, a rotary switch, or any home-made switches that perform switch functions. In reality, the shock protection switch can be of a non-contact type, such as electro-mechanical, electromagnetic, optical, electro-optic, fiber-optic, infrared, or wireless based. Furthermore, the non-contact shock protection switch can be of a sensing type, having a proximity control with a sensing range up to approximately 8 mm.

On the other hand, if the sockets of the fixture lamp holder 920 rather than the lamp holder 910 are connected to the AC mains with "L" connected to the upper pin of the bi-pin 350, no voltage exists between the input/output ports 402 and 404, and thus no power is delivered to the LED driving circuit 804. However, when the person who does the installation further inserts the lamp base 760 into the fixture lamp holder 920, the actuation mechanism 740 is actuated, which turns on the protection switch 710, thus connecting the bi-pin 350 to the input/output ports 406 and 408. In this case, the second bridge rectifier 604 senses an AC voltage between the input/output ports 406 and 408. The frequency sensitive device 801 still receives no voltage from the end 760 and sends no signal to the control device 802. The control device 802 then still determines to remain in the normal mode, keeping to connect the positive input/output port 505 to the second input 808 of the LED driving circuit 804 through the third input 806 of the control device 802, thus allowing the current to flow through the connected path followed by a current return path from the current return port 809 of the LED driving circuit 804, the input/output ports 506 and 408 of the second bridge rectifier 604, to "N" of the AC mains, delivering the power to the LED driving circuit 804 which then converts the voltage received to a predetermined level and provides an appropriate electric current to power the LED arrays 214.

Figure 5:
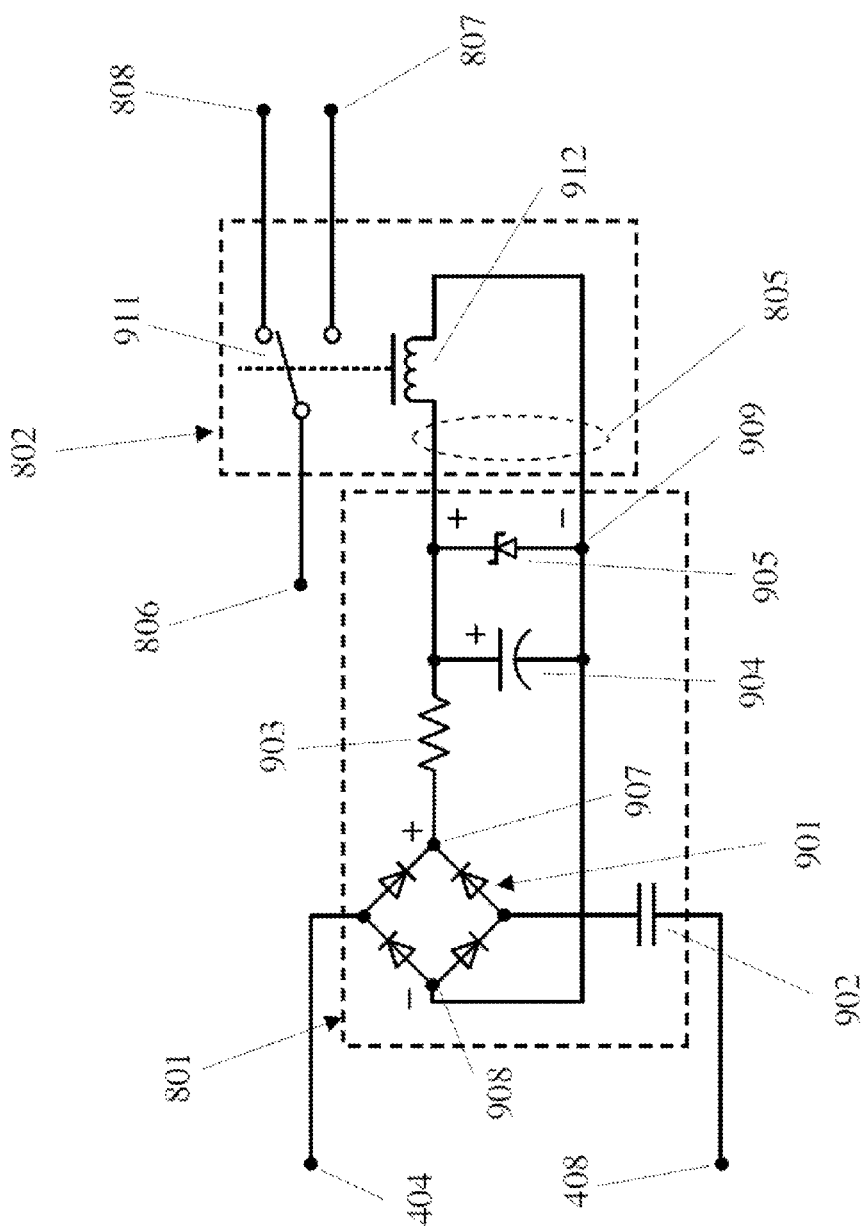
FIG. 5 is a preferred embodiment of a frequency sensitive device and a control device according to the present disclosure.

FIG. 5 is a preferred embodiment of a frequency sensing and control mechanism according to the present disclosure. The frequency sensing and control mechanism comprises a frequency sensitive device 801 and a control device 802. The frequency sensitive device 801 having two inputs comprises a capacitor 902, a third bridge rectifier 901 comprising four diodes interconnected as a full-wave rectifier, an RC circuit comprising a resistor 903 and a capacitor 904, and a Zener diode 905. The third bridge rectifier 901 has four input/output ports in which the first input/output port connects to the input/output port 404 of the first bridge rectifier 603 (in FIG. 3 and FIG. 4), and the second input/output port connects to the input/output port 408 of the second bridge rectifier 604 via the capacitor 902. The third and fourth input/output ports 907 and 908 respectively connect to the resistor 903 of the RC circuits and a low electric potential point 909 in the frequency sensitive device 801. When an AC voltage either from the AC mains or an electronic ballast exists between the input/output ports 404 and 408 of the first and the second bridge rectifiers 603 and 604, the input/output port 907 of the third bridge rectifier 901 has a high electric potential relative to the input/output port 908 with an electric potential difference depending on input voltage frequency. The capacitor 902 is a frequency sensitive component, of which the reactance is $-1/(2\pi fC)$, where f is a frequency of the voltage across its terminals, and C is a capacitance. For an AC voltage from 60 Hz AC mains and 50 KHz from an electronic ballast, the impedance across the capacitor 902 are 265 K$\Omega$ and 318$\Omega$, respectively. In other words, the electric current through the capacitor 902 for electronic ballast can be 830 times higher than that for the AC mains for the same input voltage value. The RC circuit is used to receive a voltage between the input/output ports 907 and 908 of the third bridge rectifier 901 and to build up a voltage across the capacitor 904 according to a time constant set up by resistance and capacitance of the resistor 903 and the capacitor 904. The Zener diode 905 connected to the capacitor in parallel is used to limit the voltage level inputting to the control device 802.

In FIG. 5, the control device 802 is embodied by a relay with a coil 912 and a switch 911 normally connecting to the second input 808 of the LED driving circuit 804 (in FIG. 3 and FIG. 4). When a ballast output voltage is present, the capacitor 902 has low impedance allowing a sufficient electric current to flow into the RC circuit and build up a sustaining voltage across the capacitor 904 and the Zener diode 905. The coil 912 connected in parallel with the Zener diode 905 operates to change a state of the switch 911, by connecting the third input 806 of the control device 802 to the first input 807 of the LED driving circuit 804, switching from the second input 808 of the LED driving circuit 804. When a voltage from the AC mains is present, the capacitor 902 has high impedance, and no sustaining voltage can be built up across the capacitor 904 and the Zener diode 905. The coil 912 will not operate to change the state of the switch 911, thus continuing to connect the third input 806 of the control device 802 to the second input 808 of the LED driving circuit 804. This is also true when no voltage is present, as is the case when the universal lamp is installed in a single-ended AC mains-operable lamp fixture. Although for illustration purpose, the control device 802 is embodied by a relay with a coil 912 and a switch 911, the relay can be of an electronic type such as semiconductor relays.

Figure 6:
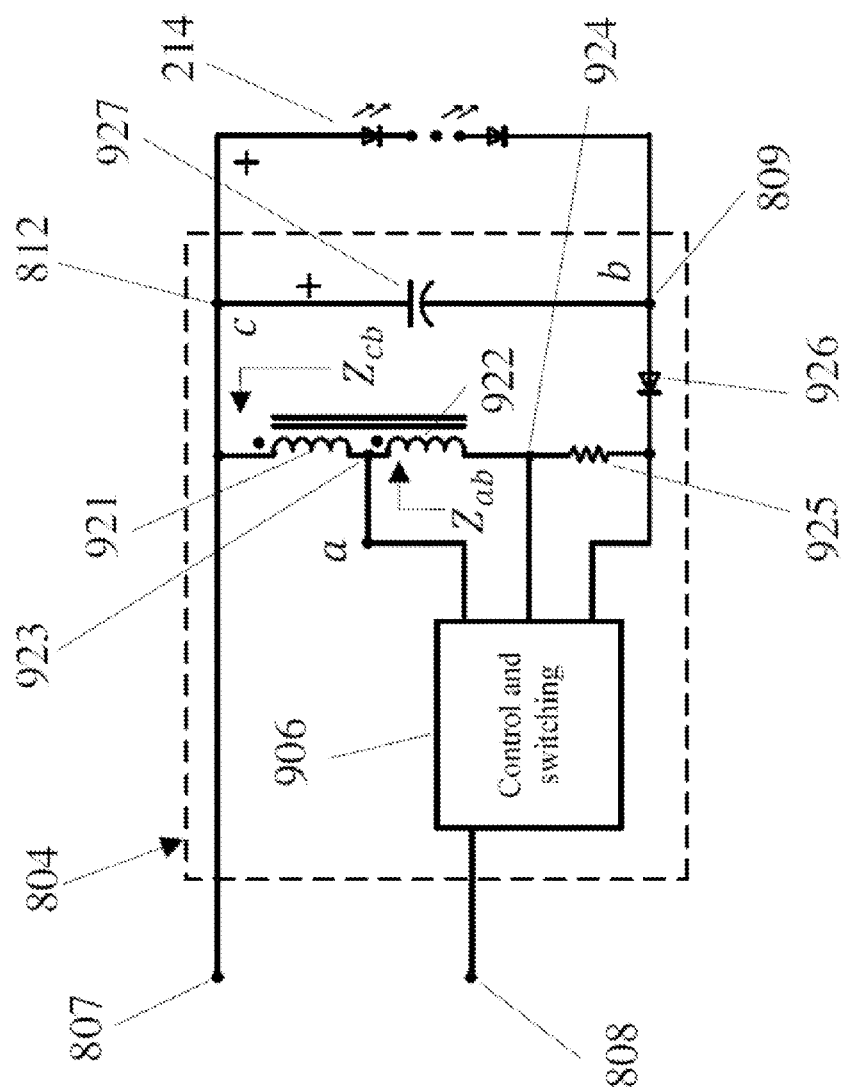
FIG. 6 is a preferred embodiment of an LED driving circuit according to the present disclosure.

FIG. 6 is a preferred embodiment of an LED driving circuit according to the present disclosure. The LED driving circuit 804 is a modified Buck converter having a first input 807 and a second input 808 both with a high electric potential relative to a low electric potential at the current return port 809 connecting to a low electric potential point of the LED arrays 214. The LED driving circuit 804 comprises a control and switching device 906, a diode 926, a capacitor 927, a current sensing resistor 925, and a center-tapped inductor with two inductors 921 and 922 connected in series at the common port 923 with a first end port 812 connecting to both the positive terminal of the capacitor 927 and the first input 807 of the LED driving circuit 804 and a second end port 924 connecting to the current sensing resistor 925. The two inductors 921 and 922 share a single magnetic core to ensure magnetic coupling. The dots near the inductors 921 and 922 denote polarities of mutually induced voltages according to the dot convention in electronics. When the control device 802 (in FIG. 5) determines that the input voltage is from the AC mains, the relay 911 remains in its normal state, connecting the third input 806 of the control device 802 to the second input 808 of the LED driving circuit 804. The control and switching device 906 having an input serving as the second input 808 of the LED driving circuit 804 converts an input rectified voltage from the first and the second bridge rectifiers 603 and 604 (in FIGS. 3 and 4) to a proper output voltage by alternating between connecting the inductors 921 and 922 to the input voltage to store energy in the inductors and discharging the inductors 921 and 922 into the LED arrays 214. The switching is controlled by a control loop governing by the current sensing resistor 925 and internal control logics in the control and switching device 906. The control and switching device 906 connecting to the common port 923 of the center-tapped inductor provides a proper current switching for the modified Buck converter to control an electric current to power the LED arrays 214.

When the control device 802 (in FIG. 5) determines that the input voltage is from an electronic ballast, the relay 911 operates to connect the third input 806 of the control device 802 to the first input 807 of the LED driving circuit 804, bypassing the control and switching device 906. The first input 807 of the LED driving circuit 804 connects to the positive terminal of the capacitor 927 used to smooth out the rectified voltage from the first and the second bridge rectifiers 603 or 604 (in FIGS. 3 and 4) and to provide more stable operation of the LED arrays 214. The LED arrays 214 with a specific stacked LED forward voltage can be used as a voltage clamping device to control an output voltage appearing at the first end port 812 of the center-tapped inductor and the positive terminal of the capacitor 927. Because both the capacitor 927 and the LED arrays 214 must be used in either case of the AC mains or an electronic ballast, their maximum ratings and a stacked forward voltage of the LED arrays 214 must meet operating requirements of both the AC mains and an electronic ballast.

In FIG. 6, the impedance of the center-tapped inductor is of particular interest and importance because it shows how the center-tapped inductor affects the impedance of the LED arrays as seen from the LED driving circuit 804 and the impedance of the control and switching device 906 as seen from ballast input port 807. In one hand, with the center-tapped inductor, the control and switching device 906 that works with the AC mains would see a modified version of the impedance of the LED arrays. Supposed that the inductors 921 and 922 have inductance L1 and L2 respectively, the impedance of the LED arrays as seen from the LED driving circuit 804 (points a and b in FIG. 6) can be shown, in the first order, as $$Z_{ab} = Z_{LED} / \left(1 + \frac{L_1}{L_2}\right)^2,$$

neglecting the current sensing resistor 925 with a small resistance less than 1Ω. Here $Z_{LED}$ is the impedance of the LED arrays 214 in parallel with the capacitor 927. When L1 is chosen greater than L2, $Z_{ab}$ can be much smaller than $Z_{LED}$, meaning that the electric current can optimally flow into the resistor-inductor-capacitor-diode circuit set by the modified Buck converter with high efficiency. On the other hand, when the ballast voltage is present, the impedance of the control and switching device 906 as seen from ballast input port 807 (points c and b in FIG. 6) can be shown, in the first order, as $$Z_{cb} = Z_{CON} \times \left(1 + \frac{L_1}{L_2}\right)^2,$$

again neglecting the current sensing resistor 925 with a small resistance less than 1Ω. Here $Z_{CON}$ is the impedance of the control and switching device 906 attached as a load for the ballast input port 807. Because $Z_{cb}$ can be much greater than $Z_{CON}$, the simple center-tapped inductor design can effectively protect the internal control logic components from damage in presence of the high ballast output voltage.

Although the above embodiment uses the third bridge rectifier and passive electronic components to implement the frequency sensing and control mechanism, the frequency sensitive device and control device may be of non-hardware type, implemented by an application-specific integrated circuit (ASIC), a field-programmable gate array (FPGA), or a microcontroller. Furthermore, although the above embodiment uses a linear LED tube lamp as an example, in fact, all the conventional fluorescent light bulbs used today can be replaced with such LED-based lamps adopting the frequency sensing and control mechanism and the novel LED driving circuit, featuring as AC main-operable and electronic ballast compatible.

In view of the above, select features of various embodiments of the present disclosure are highlighted below.

In one aspect, an LED-based lamp may have a linear tube shape. The lamp may include: a housing having two ends; a light-emitting diode printed circuit board (LED PCB), the LED PCB having LED arrays fixed thereon; an LED driving circuit configured to power the LED arrays on the LED PCB, the LED driving circuit having a first high electric potential input and a second high electric potential input; two lamp bases respectively connected to the two ends of the housing, each lamp base having a bi-pin with two pins protruding outwards, each lamp base further having a shock protection switch; two bridge rectifiers each connected to a respective one of the shock protection switches, each bridge rectifier having four input/output ports and configured to convert an alternating current (AC) voltage from an electronic ballast or AC mains to a direct current (DC) voltage; and a frequency sensing and control mechanism comprising a frequency sensitive device and a control device.

When the AC voltage from the electronic ballast is detected by the frequency sensitive device, the control device may couple the DC voltage from the two bridge rectifiers to the first high electric potential input of the LED driving circuit. When the AC voltage from the AC mains or no voltage is detected by the frequency sensitive device, the control device may couple the DC voltage from the two bridge rectifiers to the second high electric potential input of the LED driving circuit. For each lamp base, when the respective shock protection switch is off, the bi-pin may be electrically disconnected from the respective bridge rectifier and the frequency sensitive device. Further, for each lamp base, when the bi-pin is installed in a lamp socket, the respective shock protection switch may be actuated to electrically connect the two pins of the bi-pin to the respective bridge rectifier and to the frequency sensitive device.

In some embodiments, the shock protection switch of each of the lamp bases may include: two sets of electrical contacts, each set having at least two electrical contacts with one of the two electrical contacts electrically connected to one of the two pins of the bi-pin and the other of the two electrical contacts electrically connected to one of the input/output ports of the respective bridge rectifier; and a switch actuation mechanism having a front portion protruding outwards, the switch actuation mechanism configured to be activated or deactivated. When the front portion of the switch actuation mechanism is activated by installing the bi-pin of the respective lamp base in the lamp socket, the electrical contacts of each of the two sets of electrical contacts may be electrically connected to each other.

In some embodiments, the frequency sensitive device may include a capacitor, a bridge rectifier, a resistor-capacitor (RC) circuit, and a Zener diode.

In some embodiments, the control device may include a relay. In some embodiments, the relay may include a coil and a switch. In some embodiments, the relay may be of an electronic type.

In some embodiments, the LED driving circuit may include a control and switching device, a center-tapped inductor having two inductors connected in series at a center-tapped port connecting to an output of the control and switching device, a diode, a current sensing resistor, and a capacitor.

In some embodiments, the frequency sensitive device and the control device may be implemented by an application-specific integrated circuit (ASIC), a field-programmable gate array (FPGA), or a microcontroller.

In some embodiments, each of the shock protection switches may be of a contact type.

In some embodiments, each of the shock protection switches may include a snap switch, a push-button switch, a micro switch, a twist-on switch, or a rotary switch.

In some embodiments, each of the shock protection switches may be of a non-contact type.

In some embodiments, each of the shock protection switches may be electro-mechanical, electromagnetic, optical, electro-optic, fiber-optic, infrared, or wireless based.

In some embodiments, each of the shock protection switches may be of a sensing type having a proximity control with a sensing range up to approximately 8 mm.

In another aspect, an LED-based lamp may have a shape other than a linear tube. The lamp may include: a housing having at least one end; a light-emitting diode printed circuit board (LED PCB), the LED PCB having LED arrays fixed thereon; an LED driving circuit configured to power the LED arrays on the LED PCB, the LED driving circuit having a first high electric potential input and a second high electric potential input; at least one bridge rectifier having four input/output ports and configured to convert an AC voltage from an electronic ballast or AC mains to a DC voltage; a frequency sensing and control mechanism comprising a frequency sensitive device and a control device, wherein when the AC voltage from the electronic ballast is detected by the frequency sensitive device, the control device couples the DC voltage from the at least one bridge rectifier to the first high electric potential input of the LED driving circuit, and wherein when the AC voltage from the AC mains or no voltage is detected by the frequency sensitive device, the control device couples the DC voltage from the at least one bridge rectifier to the second high electric potential input of the LED driving circuit. The LED-based lamp may also include at least one lamp base connected to the at least one end of the housing, the at least one lamp base having two electrical contacts electrically connected to the at least one bridge rectifier and the frequency sensitive device.

In some embodiments, the frequency sensitive device may include a capacitor, a bridge rectifier, an RC circuit, and a Zener diode.

In some embodiments, the control device may include a relay.

In some embodiments, the relay may include a coil and a switch.

In some embodiments, the relay may be of an electronic type.

In some embodiments, the LED driving circuit may include a control and switching device, a center-tapped inductor having two inductors connected in series at a center-tapped port connecting to an output of the control and switching device, a diode, a current sensing resistor, and a capacitor.

In some embodiments, the frequency sensitive device and the control device may be implemented by an ASIC, an FPGA, or a microcontroller.

Whereas preferred embodiments of the present disclosure have been shown and described, it will be realized that alterations, modifications, and improvements may be made thereto without departing from the scope of the following claims. Another frequency sensing and control mechanism in an LED-based lamp using various kinds of combinations to accomplish the same or different objectives could be easily adapted for use from the present disclosure. Accordingly, the foregoing description and attached drawings are by way of example only, and are not intended to be limiting.

What is claimed is:
1. A linear light-emitting diode (LED) tube lamp, comprising:
    a housing having two ends;
    a light-emitting diode printed circuit board (LED PCB), the LED PCB having LED arrays fixed thereon;
    an LED driving circuit configured to power the LED arrays on the LED PCB, the LED driving circuit having a first high electric potential input and a second high electric potential input;

two lamp bases respectively connected to the two ends of the housing, each lamp base having a bi-pin with two pins protruding outwards, each lamp base further having a shock protection switch;

two bridge rectifiers each connected to a respective one of the shock protection switches, each bridge rectifier having four input/output ports and configured to convert an alternating current (AC) voltage from an electronic ballast or AC mains to a direct current (DC) voltage; and a frequency sensing and control mechanism comprising a frequency sensitive device and a control device, wherein, when the AC voltage from the electronic ballast is detected by the frequency sensitive device, the control device couples the DC voltage from the two bridge rectifiers to the first high electric potential input of the LED driving circuit, wherein, when the AC voltage from the AC mains or no voltage is detected by the frequency sensitive device, the control device couples the DC voltage from the two bridge rectifiers to the second high electric potential input of the LED driving circuit, wherein, for each lamp base, when the respective shock protection switch is off, the bi-pin is electrically disconnected from the respective bridge rectifier and the frequency sensitive device, and wherein, for each lamp base, when the bi-pin is installed in a lamp socket, the respective shock protection switch is actuated to electrically connect the two pins of the bi-pin to the respective bridge rectifier and to the frequency sensitive device.

2. The linear LED tube lamp of claim 1, wherein the shock protection switch of each of the lamp bases comprises:

two sets of electrical contacts, each set having at least two electrical contacts with one of the two electrical contacts electrically connected to one of the two pins of the bi-pin and the other of the two electrical contacts electrically connected to one of the input/output ports of the respective bridge rectifier; and a switch actuation mechanism having a front portion protruding outwards, the switch actuation mechanism configured to be activated or deactivated, wherein, when the front portion of the switch actuation mechanism is activated by installing the bi-pin of the respective lamp base in the lamp socket, the electrical contacts of each of the two sets of electrical contacts are electrically connected to each other.

3. The linear LED tube lamp of claim 1, wherein the frequency sensitive device comprises a capacitor, a bridge rectifier, a resistor-capacitor (RC) circuit, and a Zener diode.

4. The linear LED tube lamp of claim 1, wherein the control device comprises a relay.

5. The linear LED tube lamp of claim 4, wherein the relay comprises a coil and a switch.

6. The linear LED tube lamp of claim 4, wherein the relay is of an electronic type.

7. The linear LED tube lamp of claim 1, wherein the LED driving circuit comprises a control and switching device, a center-tapped inductor having two inductors connected in series at a center-tapped port connecting to an output of the control and switching device, a diode, a current sensing resistor, and a capacitor.

8. The linear LED tube lamp of claim 1, wherein the frequency sensitive device and the control device comprise an application-specific integrated circuit (ASIC), a field-programmable gate array (FPGA), or a microcontroller.

9. The linear LED tube lamp of claim 1, wherein each of the shock protection switches is of a contact type.

10. The linear LED tube lamp of claim 9, wherein each of the shock protection switches comprises a snap switch, a push-button switch, a micro switch, a twist-on switch, or a rotary switch.

11. The linear LED tube lamp of claim 1, wherein each of the shock protection switches is of a non-contact type.

12. The linear LED tube lamp of claim 11, wherein each of the shock protection switches is electro-mechanical, electro-magnetic, optical, electro-optic, fiber-optic, infrared, or wireless based.

13. The linear LED tube lamp of claim 12, wherein each of the shock protection switches is of a sensing type having a proximity control with a sensing range up to approximately 8 mm.

14. A light-emitting diode (LED)-based lamp, comprising:
a housing having at least one end;
a light-emitting diode printed circuit board (LED PCB), the LED PCB having LED arrays fixed thereon;
an LED driving circuit configured to power the LED arrays on the LED PCB, the LED driving circuit having a first high electric potential input and a second high electric potential input;
at least one bridge rectifier having four input/output ports and configured to convert an alternating current (AC) voltage from an electronic ballast or AC mains to a direct current (DC) voltage;
a frequency sensing and control mechanism comprising a frequency sensitive device and a control device, wherein:
when the AC voltage from the electronic ballast is detected by the frequency sensitive device, the control device couples the DC voltage from the at least one bridge rectifier to the first high electric potential input of the LED driving circuit, and
when the AC voltage from the AC mains or no voltage is detected by the frequency sensitive device, the control device couples the DC voltage from the at least one bridge rectifier to the second high electric potential input of the LED driving circuit; and
at least one lamp base connected to the at least one end of the housing, the at least one lamp base having two electrical contacts electrically connected to two input/output ports of the at least one bridge rectifier and the frequency sensitive device.

15. The LED-based lamp of claim 14, wherein the frequency sensitive device comprises a capacitor, a bridge rectifier, a resistor-capacitor (RC) circuit, and a Zener diode.

16. The LED-based lamp of claim 14, wherein the control device comprises a relay.

17. The LED-based lamp of claim 16, wherein the relay comprises a coil and a switch.

18. The LED-based lamp of claim 16, wherein the relay is of an electronic type.

19. The LED-based lamp of claim 14, wherein the LED driving circuit comprises a control and switching device, a center-tapped inductor having two inductors connected in series at a center-tapped port connecting to an output of the control and switching device, a diode, a current sensing resistor, and a capacitor.

20. The LED-based lamp of claim 14, wherein the frequency sensitive device and the control device comprise an application-specific integrated circuit (ASIC), a field-programmable gate array (FPGA), or a microcontroller.

* * * * *